June 2, 1970
3,515,463
45X MAGNIFICATION SEMI-OBJECTIVE WITH FIELD FLATTENING LENS
Filed July 3, 1967
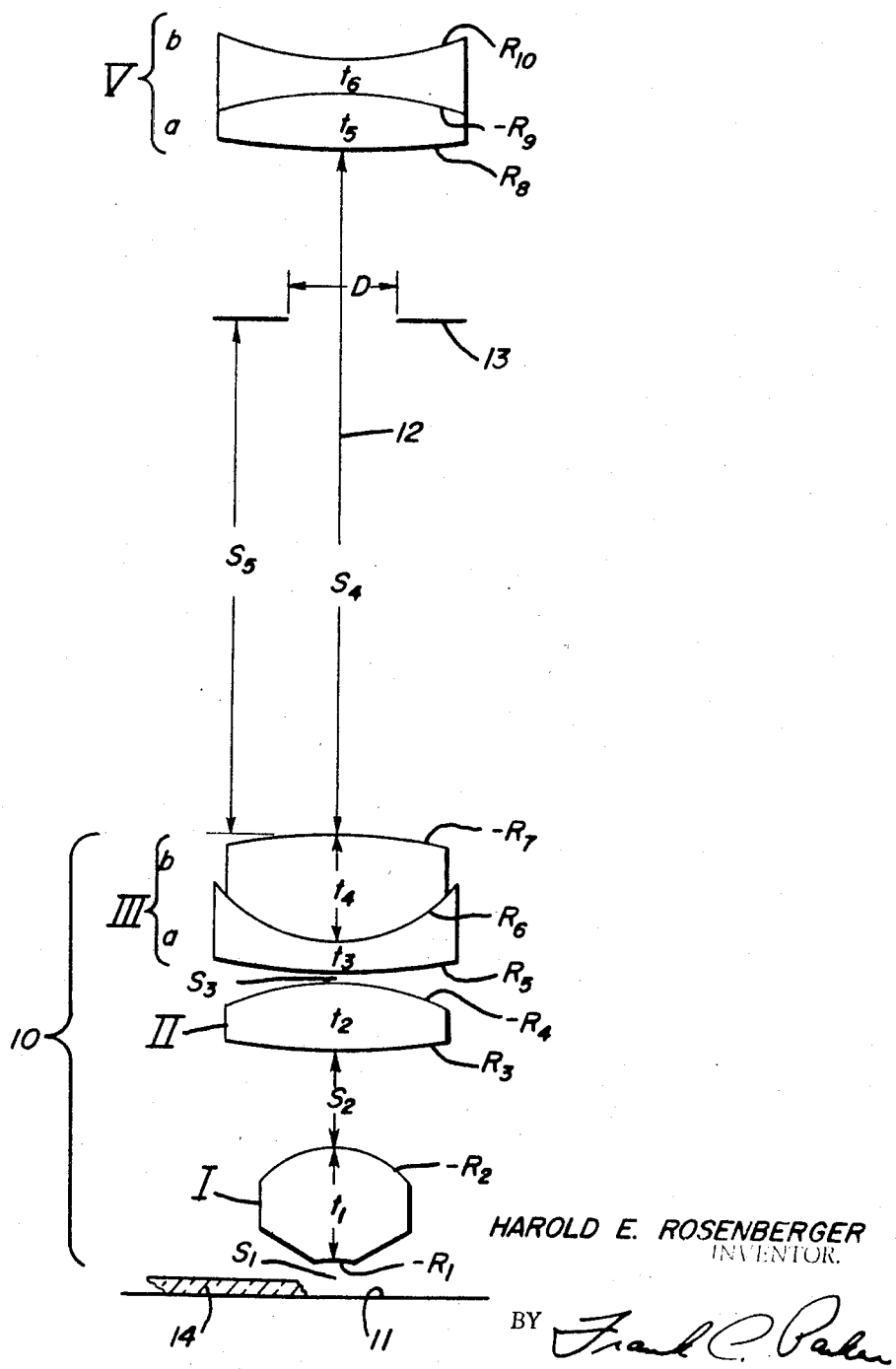
HAROLD E. ROSENBERGER
INVENTOR.
BY Frank C. Parker
ATTORNEY

United States Patent Office 3,515,463
Patented June 2, 1970

3,515,463
45× MAGNIFICATION SEMI-OBJECTIVE WITH FIELD FLATTENING LENS
Harold E. Rosenberger, Brighton, N.Y., assignor to Bausch & Lomb Incorporated, Rochester, N.Y., a corporation of New York
Filed July 3, 1967, Ser. No. 650,771
Int. Cl. G02b 1/00, 9/34
U.S. Cl. 350—224                     5 Claims

ABSTRACT OF THE DISCLOSURE

A microscope semi-objective having substantially 9.0× magnification per se which is designed for use with an associated negative field flattening lens having substantially 5.0× magnification so as to produce cooperatively a total magnification of substantially 45× and a numerical aperture of .55, said semi-objective being one of a set of such semi-objectives of different powers which are used interchangeably with the field flattening lens.

BACKGROUND OF THE INVENTION

A semi-objective of the kind described herebelow is intended for use in cooperative association with a plurality or set of other related semi-objectives in a micoscope rotatable nosepiece, the individual semi-objectives having different respective magnifications covering a large range of image magnification, each such semi-objective being corrected aberrationwise together with a single stationary prescribed negative corrector lens which is so constructed as to produce the best practical overall correction of the imaging aberrations and act as a field flattener.

With regard to the prior art, the microscope objective most nearly approaching the general structure herein disclosed in shown in British Patent 945,467 to Curties.

In the Curties patent, a series of three micro-objectives are provided having high power, medium power and low power, each one of which is totally independent of the other micro-objectives in use and design. As far as the design of this group of lenses is concerned, each rearmost negative lens 37 or 17 is independently shaped and calculated to serve only one particular objective. This constitutes a major structural and theoretical distinction from the Rosenberger micro-objective here disclosed wherein the rearmost negative lens is prescribed in its constructional details to satisfy critical optical requirements in objectives of other powers which are for instance 5×, 10× and 100× and are described in companion patent applications.

A greater distinction resides in the fact that Curties requires an aspherical surface 23, 39 or 43 in each micro-objective to reduce at least the higher order image aberrations. The asperic surfaces requires for thus reducing these aberrations are relatively costly and are never used in the present invention for any purpose.

SUMMARY OF THE INVENTION

The present invention relates to microscope optical systems and more particularly relates to improvements in the objective lens system thereof.

It is an object of the present invention to provide a novel objective lens system having substantially 45× magnification and .55 numerical aperture for a microscope, said system being formed cooperatively by a semi-objective having substantially 9.0× magnification and a prescribed negative field flattening and aberration correcting lens having substantially 5× magnification.

It is a further object to provide such a microscope objective lens system which cooperatively produces an excellent flat field and substantially corrects the chromatic and monochromatic image aberrations including secondary spectrum, Petzval condition, coma, and astigmatism, the construction thereof being comparatively economical and low cost compared to micro-objectives of comparable performance.

Further objects and advantages will be apparent in the arrangement and construction of the constituent parts in detail as set forth in the following specification taken together with the accompanying drawing.

DESCRIPTION OF THE DRAWING

The single figure of the drawing is an optical diagram showing a preferred form of the present invention.

DESCRIPTION OF THE PREFERRED EMBODIMENT

In the preferred embodiment of the present invention, there is provided a semi-objective which is generally designated by numeral 10 and it comprises a front meniscus singlet lens deseignated I having a positive focal length designated F (I). On lens I is provided a front lens surface designated $-R_1$ which is concave toward a specimen surface 11 and is spaced from surface 11 by an axial distance designated $S_1$. The rear lens surface is also concave toward the specimen surface 11 and is designated $-R_2$, surface $-R_1$ being spaced therefrom at an axial distance designated $t_1$.

Rearwardly optically aligned with lens I on an optical axis 12 is provided a singlet positive lens II or double convex form having a comparatively weakly curved front lens surface designated $R_3$ which is spaced axially from a more strongly curved lens surface $-R_4$ by an axial thickness distance $t_2$. Lens II is spaced from lens I rearwardly at an axial distance designated $S_2$.

It will be understood that the use of a minus (−) sign with any R value means that such a lens surface is curved concavely toward the specimen 11.

Spaced rearwardly of lens II at an axial distance designated $S_3$ along axis 12 is a positive doublet lens member designated III which is composed of a front negative meniscus lens element IIIa which forms an interface with a rear double convex lens element IIIb. The front and rear lens surfaces of doublet III are designated $R_5$ and $-R_7$ respectively while the interface is designated $R_6$. Lens elements IIIa and IIIb have axial thicknesses which are designated $t_3$ and $t_4$ respectively.

At an axial distance $S_4$ rearwardly of doublet III is opticaly aligned the aforementioned field flattening and aberration correcting lens which is designated V. The meniscus form and optical properties of lens V are prescribed as aforementioned so that the best average correction of aberrations and field curvature is afforded by a single lens V when used interchangeably with a plurality of semi-objectives having different magnifying powers within a range of 5× to 100×, for instance. Lens V is composed of a front double convex lens element Va which lies in contact with a rear double concave lens element designated Vb, the axial thicknesses thereof being respectively $t_5$ and $t_6$. Double lens V has front and rear lens surfaces which are designated $R_8$ and $R_{10}$ respectively and the intervening interface is designated $-R_9$.

A diaphragm 13 having an opening designated D is provided at an axial distance $S_5$ rearwardly of doublet lens III to prevent the derogatory effects of stray light.

The working distance of the micro-objective 10 is found by subtracting the thickness of the cover glass 14 from the axial space $S_1$.

The constructional data determined for the final design of the micro-objective 10 is the result of careful calculation and experiment and is set forth in ranges of values which invariably produce a successful optical system, said data being set forth in the table herebelow.

With regard to the values of the optical parameters in Table I, it will be seen that the value of each parameter is given in ranges of values which include a nominal or ideal value. These ranges of values are prescribed for the primary purpose of facilitating manufacture of the lens elements to commercial standards.

It is well known in the art that it is practically impossible to manufacture a production run of lens elements economically while holding all of the lens parameters to specific ideal values. Therefore the lens designer specifies limits or tolerances or in other words, ranges of values for each lens parameter within which the lens elements may be economically manufactured while still producing a completed objective or lens system which is capable of good and acceptable optical performance.

The technique used by the manufacturer is to separate out and classify the lens elements according to size increments which fall within said ranges of values and then selectively assemble from the lens classes a complete set of lens elements which are complementary to each other in reducing unwanted image aberrations. This technique is highly successful in producing economically a commercially acceptable optical objective having good optical performance.

In Table I of values of said parameters herebelow, $F(I)$, $F(II)$, $F(III)$ and $-F(V)$ represent the equivalent focal lengths of the successive lenses I, II, III and V in terms of F which represents the total focal length of all of said lenses, the focal lengths designations of the lens elements IIIa, IIIb, Va, and Vb being respectively $-F(IIIa)$, $F(IIIb)$, $F(Va)$ and $-F(Vb)$, the minus $(-)$ sign meaning negative focal length and the other designations being defined hereabove.

TABLE I $2.598F < F(I) < 2.758F$
$5.356F < F(II) < 5.688F$
$10.264F < F(III) < 10.898F$
$9.675F < -F(V) < 10.273F$
$3.685F < -F(IIIa) < 3.913F$
$5.376F < F(Va) < 5.708F$
$0.222F < S_1 < 0.236F$
$1.280F < S_2 < 1.360F$
$0.073 < S_3 < 0.077F$
$8.793F < S_4 < 9.337F$
$6.886F < S_5 < 7.312F$
$1.479F < D < 1.539F$
$2.333F < -R_1 < 2.477F$
$1.180F < -R_2 < 1.254F$
$34.990F < R_3 < 37.154F$
$2.964F < -R_4 < 3.148F$
$7.584F < R_5 < 8.054F$
$1.976F < R_6 < 2.099F$
$7.177F < -R_7 < 7.621F$
$11.801F < R_8 < 12.531F$
$5.969F < -R_9 < 6.339F$
$3.076F < R_{10} < 3.267F$
$1.455F < t_1 < 1.545F$
$0.815F < t_2 < 0.865F$
$0.437F < t_3 < 0.464F$
$1.254F < t_4 < 1.332F$
$0.728F < t_5 < 0.773F$
$0.437F < t_6 < 0.464F$

Furthermore, the ranges of values in terms of absolute numbers are given in Table II herebelow for the refractive index $n_D$ and Abbe number $\nu$ of the glasses used in the successive lens elements I to Vb.

TABLE II $1.618 < n_D(I) < 1.622$
$1.512 < n_D(II) < 1.516$
$1.748 < n_D(IIIa) < 1.754$
$1.587 < n_D(IIIb) < 1.591$

TABLE II—Continued $1.748 < n_D(Va) < 1.754$
$1.611 < n_D(Vb) < 1.615$
$59.0 < \nu(I) < 61.0$
$69.0 < \nu(II) < 71.0$
$27.3 < \nu(IIIa) < 28.0$
$60.5 < \nu(IIIb) < 62.0$
$27.3 < \nu(Va) < 28.0$
$43.5 < \nu(Vb) < 44.8$ More specifically, the nominal values, in terms of F, are given substantially for all of the aforementioned optical parameters in Table III herebelow wherein the designations remain the same as given in Tables I and II, the $n_D$ and $\nu$ values being absolute values.

TABLE III $F(I) = 2.678F$
$F(II) = 5.522F$
$F(III) = 10.581F$
$-F(IIIa) = 3.799F$
$F(IIIb) = 2.862F$
$-F(V) = 9.838F$
$F(Va) = 5.542F$
$-F(Vb) = 3.353F$ $$\frac{-F(IIIa)}{F(IIIb)} = 1.327$$

$$\frac{F(Va)}{-F(Vb)} = 1.653$$

$S_1 = 0.229F$
$S_2 = 1.320F$
$S_3 = 0.075F$
$S_4 = 9.065F$
$S_5 = 7.099F$
$D = 1.509F$
$-R_1 = 2.405F$
$-R_2 = 1.217F$
$R_3 = 36.072F$
$-R_4 = 3.056F$
$R_5 = 7.819F$
$R_6 = 2.038F$
$-R_7 = 7.399F$
$R_8 = 12.166F$
$-R_9 = 6.154F$
$R_{10} = 3.171F$
$t_1 = 1.500F$
$t_2 = 0.840F$
$t_3 = 0.450F$
$t_4 = 1.293F$
$t_5 = 0.750F$
$t_6 = 0.450F$
$n_D(I) = 1.620$
$n_D(II) = 1.514$
$n_D(IIIa) = 1.7506$
$n_D(IIIb) = 1.588$
$n_D(Va) = 1.7506$
$n_D(Vb) = 1.613$
$\nu(I) = 60.3$
$\nu(II) = 70.2$
$\nu(IIIa) = 27.8$
$\nu(IIIb) = 61.2$
$\nu(Va) = 27.8$
$\nu(Vb) = 44.2$

Although only one particular form of the invention has been shown and described in detail other forms are possible and changes may be made in the optical details within the ranges of values stated heretofore without departing from the spirit of the invention.

I claim:

1. A microscope semi-objective which is used in cooperation with a prescribed negative field flattening and aberration correcting lens designated V having 5× magnification per se, said negative lens being interchangeably used with each one of a set of semi-objectives having different powers, said semi-objectives being parfocalized to each other, said field flattening lens and semi-objective being designed to cooperatively produce a total image magnification of 45× and numerical aperture of .55, the first named semi-objective per se producing substantially 9× magnification and having an equivalent focal length which is designated $F_1$, the equivalent focal length of said field flattening lens being designated $-F(V)$, the equivalent focal length of the semi-objective together with said field flattening lens being designated F, said semi-objective comprising:

a front singlet positive lens member designated I which is located adjacent to a specimen surface to be examined at an axial distance designated $S_1$, a positive singlet lens member designated II located in optical alignment along an optical axis rearwardly from lens member I at an axial distance designated $S_2$, lens member II having its more weakly curved surface facing member I, a positive doublet lens member designated III located at an axial distance designated $S_3$ rearwardly of lens member II, member III being composed of a front negative meniscus lens element IIIa which lies in surface contact with a rear double convex lens element designated IIIb, rear element IIIb being located at an axial distance $S_4$ from the aforesaid negative field flattening lens which is composed of a front double convex lens element Va which lies in surface contact with a rear double concave lens element Vb, the ranges of values, in terms of F, for the constructional data by which the aforesaid lens members and lens elements I to Vb are formed being given in the table herebelow wherein $F(I)$ to $-F(V)$ designate the focal length of the aforesaid negative field flattening lens, the minus (—) sign meaning negative focal length, the designations $-F(IIIa)$, $F(IIIb)$, $F(Va)$ and $-F(Vb)$ pertaining to the respective lens elements aforementioned, the designations $t_1$ to $t_6$ relating to the axial thicknesses of the successive lens elements, the designations $S_1$ to $S_4$ being the successive air-spaces numbering from the specimen surface rearwardly, $$2.598F < F(I) < 2.758F$$
$$5.356F < F(II) < 5.688F$$
$$10.264F < F(III) < 10.898F$$
$$9.675F < -F(V) < 10.273F$$

$$\frac{-F(IIIa)}{F(IIIb)} = 1.327 \text{ substantially}$$

$$\frac{F(Va)}{-F(Vb)} = 1.653 \text{ substantially}$$

$$1.455F < t_1 < 1.545F$$
$$0.815F < t_2 < 0.865F$$
$$0.437F < t_3 < 0.464F$$
$$1.254F < t_4 < 1.332F$$
$$0.728F < t_5 < 0.773F$$
$$0.437F < t_6 < 0.464F$$
$$0.222F < S_1 < 0.236F$$
$$1.280F < S_2 < 1.360F$$
$$0.073F < S_3 < 0.077F$$
$$8.793F < S_4 < 9.337F$$

2. A microscope semi-objective which is used in cooperation with a prescribed negative field flattening and aberration correcting lens designated V having 5× magnification per se, said negative lens being interchangeably used with each one of a set of semi-objectives having different powers, said semi-objectives being parfocalized to each other, said field flattening lens and semi-objective being designed to cooperatively produce a total image magnification of 45× and numerical aperture of .55, the first named semi-objective per se producing substantially 9× magnification and having an equivalent focal length which is designated $F_1$, the equivalent focal length of said field flattening lens being designated $-F(V)$, the equivalent focal length of the semi-objective together with said field flattening lens being designated F, said semi-objective comprising a front singlet positive member designated I which is located adjacent to a specimen surface to be examined at an axial distance designated $S_1$, a positive singlet lens member designated II located in optical alignment along an optical axis rearwardly from lens member I at an axial distance designated $S_2$, lens member II having its more weakly curved surface facing member I, a positive doublet lens member designated III located at an axial distance designated $S_3$ rearwardly of lens member II, member III being composed of a front negative meniscus lens element IIIa which lies in surface contact with a rear double convex lens element designated IIIb, rear element IIIb being located at an axial distance $S_4$ from the aforesaid negative field flattening lens which is composed of a front double convex lens element Va which lies in surface contact with a rear double concave lens element Vb, the ranges of values, in terms of F, for the constructional data by which the aforesaid lens members and lens elements I to Vb are formed being given in the table herebelow wherein $F(I)$ to $-F(V)$ designate the focal lengths of said members and $-F(V)$ designates the focal length of the aforesaid negative field flattening lens, the minus (—) sign meaning negative focal length, the designations $-F(IIIa)$, $F(IIIb)$, $F(Va)$ and $-F(Vb)$ pertaining to the respective lens elements aforementioned, the designations $t_1$ to $t_6$ relating to the axial thickness of the successive lens elements, the designations $S_1$ to $S_4$ being the successive air-spaces numbering from the specimen surface rearwardly, $$2.598F < F(I) < 2.758F$$
$$5.356F < F(II) < 5.688F$$
$$10.264F < F(III) < 10.898F$$
$$9.675F < -F(V) < 10.273F$$

$$\frac{-F(IIIa)}{F(IIIb)} = 1.327 \text{ substantially}$$

$$\frac{F(Va)}{-F(Vb)} = 1.653 \text{ substantially}$$

$$1.455F < t_1 < 1.545F$$
$$0.815F < t_2 < 0.865F$$
$$0.437F < t_3 < 0.464F$$
$$1.254F < t_4 < 1.332F$$
$$0.728F < t_5 < 0.773F$$
$$0.437F < t_6 < 0.464F$$
$$0.222F < S_1 < 0.236F$$
$$1.280F < S_2 < 1.360F$$
$$0.073F < S_3 < 0.077F$$
$$8.793F < S_4 < 9.337F$$

the ranges of absolute values for the refractive index $n_D$ and Abbe number $\nu$ relating to the glasses from which the successive lens elements I to Vb are made being given in the second table appearing herebelow, $$1.618 < n_D(I) < 1.622$$
$$1.512 < n_D(II) < 1.516$$
$$1.748 < n_D(IIIa) < 1.754$$
$$1.587 < n_D(IIIb) < 1.591$$
$$1.748 < n_D(Va) < 1.754$$
$$1.611 < n_D(Vb) < 1.615$$
$$59.0 < \nu(I) < 61.0$$
$$69.0 < \nu(II) < 71.0$$
$$27.3 < \nu(IIIa) < 28.0$$
$$60.5 < \nu(IIIb) < 62.0$$
$$27.3 < \nu(Va) < 28.0$$
$$43.5 < \nu(Vb) < 44.8$$

3. A microscope semi-objective which is used in co-operation with a prescribed negative field flattening and aberration correcting lens designated V having 5× magnification per se, said negative lens being interchangeably used with each one of a set of semi-objectives having different powers, said semi-objectives being parfocalized to each other, said field flattening lens and semi-objective being designed to cooperatively produce a total image magnification of 45× and numerical aperture of .55, the first named semi-objective per se producing substantially 9× magnification, the equivalent focal length of the semi-objective together with said field flattening lens being designated F, said semi-objective comprising a front singlet positive lens member designated I which is located adjacent to a specimen surface to be examined at an axial distance designated $S_1$, a positive singlet lens member designated II located in optical alignment along an optical axis rearwardly from lens member I at an axial distance designated $S_2$, lens member II having its more weakly curved surface facing member I, a positive doublet lens member designated III located at an axial distance designated $S_3$ rearwardly of lens member II, member III being composed of a front negative meniscus lens element IIIa which lies in surface contact with a rear double convex lens element designated IIIb, rear element IIIb being located at an axial distance $S_4$ from the aforesaid negative field flattening lens which is composed of a front double convex lens element Va which lies in surface contact with a rear double concave lens element Vb, the ranges of values, in terms of F, for the constructional data by which the aforesaid lens members and lens elements I to Vb are formed being given in the table herebelow wherein $-R_1$ to $R_{10}$ represent the successive radii of the lens surfaces formed on the lens elements I to Vb numbering from the front, the minus (—) sign meaning that the lens surface so identified has its center of curvature located on the front side of said surface, the designations $t_1$ to $t_6$ relating to the axial thicknesses of the successive lens elements, the designations $S_1$ to $S_4$ being the successive airspaces numbering from the specimen surface rearwardly, $2.333F < -R_1 < 2.477F$
$1.180F < -R_2 < 1.254F$
$34.990F < R_3 < 37.154F$
$2.964F < -R_4 < 3.148F$
$7.584F < R_5 < 8.054F$
$1.976F < R_6 < 2.099F$
$7.177F < -R_7 < 7.621F$
$11.801F < R_8 < 12.531F$
$5.969F < -R_9 < 6.339F$
$3.076F < R_{10} < 3.267F$
$1.455F < t_1 < 1.545F$
$0.815F < t_2 < 0.865F$
$0.437F < t_3 < 0.464F$
$1.254F < t_4 < 1.332F$
$0.728F < t_5 < 0.773F$
$0.437F < t_6 < 0.464F$
$0.222F < S_1 < 0.236F$
$1.280F < S_2 < 1.360F$
$0.073F < S_3 < 0.077F$
$8.793F < S_4 < 9.337F$ the ranges of absolute values for the refractive index $n_D$ and Abbe number $\nu$ relating to glasses from which the successive lens elements I to Vb are made being given in the second table appearing herebelow, $1.618 < n_D(I) < 1.622$
$1.512 < n_D(II) < 1.516$
$1.748 < n_D(IIIa) < 1.754$
$1.587 < n_D(IIIb) < 1.591$
$1.748 < n_D(Va) < 1.754$
$1.611 < n_D(Vb) < 1.615$
$59.0 < \nu(I) < 61.0$
$69.0 < \nu(II) < 71.0$
$27.3 < \nu(IIIa) < 28.0$
$60.5 < \nu(IIIb) < 62.0$
$27.3 < \nu(Va) < 28.0$
$43.5 < \nu(Vb) < 44.8$ 4. A microscope semi-objective which is used in cooperation with a prescribed negative field flattening and aberration correcting lens designated V having 5× magnification per se, said negative lens being interchangeably used with each one of a set of semi-objectives having different powers, said semi-objectives being parfocalized to each other, said field flattening lens and semi-objective being designed to cooperatively produce a total image magnification of 45× and numerical aperture of .55, the first named semi-objective per se producing substantially 9× magnification, the equivalent focal length of said field flattening lens being designated $-F(V)$, the equivalent focal length of the semi-objective together with said field flattening lens being designated F, said semi-objective comprising:

a front singlet positive lens member designated I which is located adjacent to a specimen surface to be examined at an axial distance designated $S_1$, a positive singlet lens member designated II located in optical alignment along an optical axis rearwardly from lens member I at an axial distance designated $S_2$, lens member II having its more weakly curved surface facing member I, a positive doublet lens member designated III located at an axial distance designated $S_3$ rearwardly of lens member II, member III being composed of a front negative meniscus lens element IIIa which lies in surface contact with a rear double convex lens element designated IIIb, rear element IIIb being located at an axial distance $S_4$ from the aforesaid negative field flattening lens which is composed of a front double convex lens element Va which lies in surface contact with a rear double concave lens element Vb, the specific values, in terms of F, for the constructional data by which the aforesaid lens members and lens elements I to Vb are formed being given substantially in the Table herebelow wherein F(I) to $-F(V)$ designate the focal lengths of said members and $-F(V)$ designates the focal length of the aforesaid negative field flattening lens, the minus (—) sign meaning negative focal length, the designations $-F(IIIa)$, $F(IIIb)$, $F(Va)$ and $-F(Vb)$ pertaining to the respective lens elements aforementioned, the designations $t_1$ to $t_6$ relating to the axial thicknesses of the successive lens elements, the designations $S_1$ to $S_4$ being the successive airspaces numbering from the specimen surface rearwardly, $F(I) = 2.678F$
$F(II) = 5.522F$
$F(III) = 10.581F$
$-F(V) = 9.838F$ $$\frac{-F(IIIa)}{F(IIIb)} = 1.327$$

$$\frac{F(Va)}{-F(Vb)} = 1.653$$

$t_1 = 1.500F$
$t_2 = 0.840F$
$t_3 = 0.450F$
$t_4 = 1.293F$
$t_5 = 0.750F$
$t_6 = 0.450F$
$S_1 = 0.299F$ $S_2 = 1.320F$
$S_3 = 0.075F$
$S_4 = 9.065F$ the specific absolute values for the refractive index $n_D$ and Abbe number $\nu$ relating to the glasses from which th successive lens elements I to Vb are made being given substantially in the table appearing herebelow.

$n_D(I) = 1.620$
$n_D(II) = 1.514$
$n_D(IIIa) = 1.7506$
$n_D(IIIb) = 1.588$
$n_D(Va) = 1.7506$
$n_D(Vb) = 1.613$
$\nu(I) = 60.3$
$\nu(II) = 70.2$
$\nu(IIIa) = 27.8$
$\nu(IIIb) = 61.2$
$\nu(Va) = 27.8$
$\nu(Vb) = 44.2$

5. A microscope semi-objective which is used in cooperation with a prescribed negative field flattening and aberration correcting lens designated V having 5× magnification per se, said negative lens being interchangeably used with each one of a set of semi-objectives having different powers, said semi-objectives being parfocalized to each other, said field flattening lens and semi-objective being designed to cooperatively produce a total image magnification of 45× and numerical aperture of .55, the first named semi-objective per se producing substantially 9× magnification, the equivalent focal length of the semi-objective together with said field flattening lens being designated F, said semi-objective comprising a front singlet positive lens member designated I which is located adjacent to a specimen surface to be examined at an axial distance designated $S_1$, a positive singlet lens member designated II located in optical alignment along an optical axis rearwardly from lens member I at an axial distance designated $S_2$, lens member II having its more weakly curved surface facing member I, a positive doublet lens member designated III located at an axial distance designated $S_3$ rearwardly of lens member II, member III being composed of a front negative meniscus lens element IIIa which lies in surface contact with a rear double convex lens element designated IIIb, rear element IIIb being located at an axial distance $S_4$ from the aforesaid negative field flattening lens which is composed of a front double convex lens element Va which lies in surface contact with a rear double concave lens element Vb, the specific values, in terms of F, for the constructional data by which the aforesaid lens members and lens elements I to Vb are formed being given substantially in the table herebelow wherein $-R_1$ to $R_{10}$ represent the successive radii of the lens surfaces formed on the lens elements I to Vb numbering from the front, the minus (—) sign meaning that the lens surface so identified has its center of curvature located on the front side of said surface, the designations $t_1$ to $t_6$ relating to the axial thicknesses of the successive lens elements, and the designations $S_1$ to $S_4$ being the successive airspaces numbering from the specimen surface rearwardly, $-R_1 = 2.405F$
$-R_2 = 1.217F$
$R_3 = 36.072F$
$-R_4 = 3.056F$
$R_5 = 7.819F$
$R_6 = 2.038F$
$-R_7 = 7.399F$
$R_8 = 12.166F$
$-R_9 = 6.154F$
$R_{10} = 3.171F$
$t_1 = 1.500F$
$t_2 = 0.840F$
$t_3 = 0.450F$
$t_4 = 1.293F$
$t_5 = 0.750F$
$t_6 = 0.450F$
$S_1 = 0.229F$
$S_2 = 1.320F$
$S_3 = 0.075F$
$S_4 = 9.065F$ the specific absolute values for the refractive index $n_D$ and the Abbe number $\nu$ relating to the glasses from which the successive lens elements I to Vb are made being given substantially in the table appearing herebelow, $n_D(I) = 1.620$
$n_D(II) = 1.514$
$n_D(IIIa) = 1.7506$
$n_D(IIIb) = 1.588$
$n_D(Va) = 1.7506$
$n_D(Vb) = 1.613$
$\nu(I) = 60.3$
$\nu(II) = 70.2$
$\nu(IIIa) = 27.8$
$\nu(IIIb) = 61.2$
$\nu(Va) = 27.8$
$\nu(Vb) = 44.2$

References Cited

UNITED STATES PATENTS 3,399,017  8/1968  Judd _____ 350—224
3,410,633  11/1968  Young _____ 350—177 X DAVID SCHONBERG, Primary Examiner P. A. SACHER, Assistant Examiner U.S. Cl. X.R.

350—177